United States Patent
Hafner et al.

(10) Patent No.: US 8,498,763 B2
(45) Date of Patent: Jul. 30, 2013

(54) MAINTAINING ENERGY PRINCIPAL PREFERENCES IN A VEHICLE

(75) Inventors: James Lee Hafner, San Jose, CA (US); Colin George Harrison, Brookfield, CT (US); Melissa Wiltsey O'Mara, Tully, NY (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 12/139,561

(22) Filed: Jun. 16, 2008

(65) Prior Publication Data

US 2009/0312903 A1    Dec. 17, 2009

(51) Int. Cl.
| | |
|---|---|
| G06F 21/00 | (2006.01) |
| G06F 17/00 | (2006.01) |
| G06F 7/00 | (2006.01) |
| G01R 21/133 | (2006.01) |
| B60L 11/00 | (2006.01) |
| B60L 11/18 | (2006.01) |
| G07B 15/00 | (2006.01) |
| G07B 15/06 | (2011.01) |

(52) U.S. Cl.
USPC .......... 701/22; 701/29.1; 701/32.3; 705/7.22; 705/412

(58) Field of Classification Search
USPC .............. 701/1, 22, 29–33, 35, 36, 123, 29.1, 701/29.6, 31.4, 32.3; 180/65.1, 65.29; 307/9.1, 307/10.1, 10.7; 705/1.1, 7.12, 7.22, 13, 14.1, 705/400, 412
See application file for complete search history.

(56) References Cited

U.S. PATENT DOCUMENTS

| | | | |
|---|---|---|---|
| 3,867,682 | A | 2/1975 | Yamauchi et al. |
| 4,306,156 | A | 12/1981 | Monaco et al. |
| 4,351,405 | A | 9/1982 | Fields et al. |
| 4,389,608 | A | 6/1983 | Dahl et al. |
| 4,433,278 | A | 2/1984 | Lowndes et al. |
| 4,532,418 | A | 7/1985 | Meese et al. |
| 5,049,802 | A | 9/1991 | Mintus et al. |

(Continued)

FOREIGN PATENT DOCUMENTS

| | | |
|---|---|---|
| AU | 2003208173 | 9/2003 |
| JP | 2000279519 | 10/2000 |

(Continued)

OTHER PUBLICATIONS

USPTO office action for U.S. Appl. No. 12/194,290 dated Jun. 4, 2010.

(Continued)

Primary Examiner — Thomas Tarcza
Assistant Examiner — Edward Pipala
(74) Attorney, Agent, or Firm — Yee & Associates, P.C.; David A. Mims

(57) ABSTRACT

A computer implemented method, apparatus, and computer usable program product for managing user preferences associated with charging transactions for electric vehicles. In one embodiment, a set of principals associated with a charging transaction for an electric vehicle is identified in response to receiving a request for a set of preferences from an energy transaction planner. The vehicle preference service is located on the electric vehicle. The set of preferences are retrieved from a plurality of preferences. The set of preferences comprises a subset of preferences for each principal in the set of principals. A preference in the set of preferences specifies a parameter of the charging transaction that is to be minimized, maximized, or optimized. The set of preferences are sent to an energy transaction planner.

17 Claims, 9 Drawing Sheets

U.S. PATENT DOCUMENTS

| | | | |
|---|---|---|---|
| 5,184,058 | A | 2/1993 | Hesse et al. |
| 5,343,970 | A | 9/1994 | Severinsky |
| 5,359,228 | A | 10/1994 | Yoshida |
| 5,422,624 | A | 6/1995 | Smith |
| 5,441,122 | A | 8/1995 | Yoshida |
| 5,487,002 | A | 1/1996 | Diller et al. |
| 5,492,189 | A | 2/1996 | Kriegler et al. |
| 5,492,190 | A | 2/1996 | Yoshida |
| 5,548,200 | A | 8/1996 | Nor et al. |
| 5,563,491 | A | 10/1996 | Tseng |
| 5,566,774 | A | 10/1996 | Yoshida |
| 5,594,318 | A | 1/1997 | Nor et al. |
| 5,627,752 | A | 5/1997 | Buck et al. |
| 5,642,270 | A | 6/1997 | Green et al. |
| 5,675,205 | A | 10/1997 | Jacob et al. |
| 5,736,833 | A | 4/1998 | Farris |
| 5,778,326 | A | 7/1998 | Moroto et al. |
| 6,067,008 | A | 5/2000 | Smith |
| 6,081,205 | A | 6/2000 | Williams |
| 6,225,776 | B1 | 5/2001 | Chai |
| 6,234,932 | B1 | 5/2001 | Kuroda et al. |
| 6,252,380 | B1 | 6/2001 | Koenck |
| 6,278,915 | B1 | 8/2001 | Deguchi et al. |
| 6,285,931 | B1 | 9/2001 | Hattori et al. |
| 6,301,531 | B1 | 10/2001 | Pierro et al. |
| 6,307,349 | B1 | 10/2001 | Koenck et al. |
| 6,373,380 | B1 | 4/2002 | Robertson et al. |
| 6,434,465 | B2 | 8/2002 | Schmitt et al. |
| 6,456,041 | B1 | 9/2002 | Terada et al. |
| 6,466,658 | B2 | 10/2002 | Schelberg, Jr. et al. |
| 6,480,767 | B2 | 11/2002 | Yamaguchi et al. |
| 6,487,477 | B1 | 11/2002 | Woestman et al. |
| 6,586,866 | B1 | 7/2003 | Ikedo et al. |
| 6,609,582 | B1 | 8/2003 | Botti et al. |
| 6,614,204 | B2 | 9/2003 | Pellegrino et al. |
| 6,629,024 | B2 | 9/2003 | Tabata et al. |
| 6,727,809 | B1 | 4/2004 | Smith |
| 6,741,036 | B1 | 5/2004 | Ikedo et al. |
| 6,766,949 | B2 | 7/2004 | Terranova et al. |
| 6,789,733 | B2 | 9/2004 | Terranova et al. |
| 6,794,849 | B2 | 9/2004 | Mori et al. |
| 6,850,898 | B1 | 2/2005 | Murakami et al. |
| 6,909,200 | B2 | 6/2005 | Bouchon |
| 6,915,869 | B2 | 7/2005 | Botti et al. |
| 7,013,205 | B1 | 3/2006 | Hafner et al. |
| 7,027,890 | B2 | 4/2006 | Wilson |
| 7,039,389 | B2 | 5/2006 | Johnson, Jr. |
| 7,049,720 | B2 | 5/2006 | Darday |
| 7,178,616 | B2 | 2/2007 | Botti et al. |
| 7,216,729 | B2 | 5/2007 | Syed et al. |
| 7,243,010 | B2 | 7/2007 | Tabata et al. |
| 7,309,966 | B2 | 12/2007 | Wobben |
| 7,402,978 | B2 | 7/2008 | Pryor |
| 7,565,396 | B2 | 7/2009 | Hoshina |
| 7,674,536 | B2 | 3/2010 | Chipchase et al. |
| 7,693,609 | B2 | 4/2010 | Kressner et al. |
| 7,698,078 | B2 | 4/2010 | Kelty et al. |
| 7,740,092 | B2 | 6/2010 | Bender |
| 7,885,893 | B2 | 2/2011 | Alexander |
| 7,949,435 | B2 | 5/2011 | Pollack et al. |
| 7,956,570 | B2 | 6/2011 | Lowenthal et al. |
| 7,991,665 | B2 | 8/2011 | Hafner et al. |
| 8,054,048 | B2 | 11/2011 | Woody et al. |
| 8,103,386 | B2 | 1/2012 | Ichikawa et al. |
| 8,103,391 | B2 | 1/2012 | Ferro et al. |
| 2002/0064258 | A1 | 5/2002 | Schelberg, Jr. et al. |
| 2002/0153726 | A1 | 10/2002 | Sumner |
| 2003/0137277 | A1 | 7/2003 | Mori et al. |
| 2003/0153278 | A1 | 8/2003 | Johnson, Jr. |
| 2003/0205619 | A1 | 11/2003 | Terranova et al. |
| 2004/0046506 | A1 | 3/2004 | Kawai et al. |
| 2004/0062059 | A1 | 4/2004 | Cheng et al. |
| 2004/0265671 | A1 | 12/2004 | Chipchase et al. |
| 2005/0008904 | A1 | 1/2005 | Suppes |
| 2005/0044245 | A1 | 2/2005 | Hoshina |
| 2005/0231119 | A1 | 10/2005 | Ito et al. |
| 2006/0182241 | A1 | 8/2006 | Schelberg, Jr. et al. |
| 2006/0282381 | A1 | 12/2006 | Ritchie |
| 2006/0287783 | A1 | 12/2006 | Walker |
| 2007/0126395 | A1 | 6/2007 | Suchar |
| 2007/0282495 | A1 | 12/2007 | Kempton et al. |
| 2008/0039979 | A1 | 2/2008 | Bridges et al. |
| 2008/0039989 | A1 | 2/2008 | Pollack et al. |
| 2008/0040223 | A1 | 2/2008 | Bridges et al. |
| 2008/0040295 | A1 | 2/2008 | Kaplan et al. |
| 2008/0052145 | A1 | 2/2008 | Kaplan et al. |
| 2008/0086411 | A1 | 4/2008 | Olson et al. |
| 2008/0097904 | A1 | 4/2008 | Volchek et al. |
| 2008/0155008 | A1 | 6/2008 | Stiles et al. |
| 2008/0180027 | A1 | 7/2008 | Matsushita et al. |
| 2008/0228613 | A1 | 9/2008 | Alexander |
| 2008/0281663 | A1 | 11/2008 | Hakim et al. |
| 2008/0312782 | A1 | 12/2008 | Berdichevsky et al. |
| 2009/0021213 | A1 | 1/2009 | Johnson |
| 2009/0030712 | A1 | 1/2009 | Bogolea et al. |
| 2009/0043519 | A1 | 2/2009 | Bridges et al. |
| 2009/0066287 | A1 | 3/2009 | Pollack et al. |
| 2009/0076913 | A1 | 3/2009 | Morgan |
| 2009/0082957 | A1 | 3/2009 | Agassi et al. |
| 2009/0091291 | A1 | 4/2009 | Woody et al. |
| 2009/0092864 | A1 | 4/2009 | McLean et al. |
| 2009/0144001 | A1 | 6/2009 | Leonard et al. |
| 2009/0174365 | A1 | 7/2009 | Lowenthal et al. |
| 2009/0177580 | A1 | 7/2009 | Lowenthal et al. |
| 2009/0210357 | A1 | 8/2009 | Pudar et al. |
| 2009/0287578 | A1 | 11/2009 | Paluszek et al. |
| 2009/0313032 | A1 | 12/2009 | Hafner et al. |
| 2009/0313033 | A1 | 12/2009 | Hafner et al. |
| 2009/0313034 | A1 | 12/2009 | Ferro et al. |
| 2009/0313098 | A1 | 12/2009 | Hafner et al. |
| 2009/0313103 | A1 | 12/2009 | Ambrosio et al. |
| 2009/0313104 | A1 | 12/2009 | Hafner et al. |
| 2009/0313174 | A1 | 12/2009 | Hafner et al. |
| 2010/0017045 | A1 | 1/2010 | Nesler et al. |
| 2010/0049396 | A1 | 2/2010 | Ferro et al. |
| 2010/0049533 | A1 | 2/2010 | Ferro et al. |
| 2010/0049610 | A1 | 2/2010 | Ambrosio et al. |
| 2010/0049639 | A1 | 2/2010 | Ferro et al. |
| 2010/0049737 | A1 | 2/2010 | Ambrosio et al. |
| 2010/0169008 | A1 | 7/2010 | Niwa et al. |
| 2011/0071923 | A1 | 3/2011 | Kende et al. |

FOREIGN PATENT DOCUMENTS

| | | |
|---|---|---|
| JP | 2000289355 | 10/2000 |
| JP | 2001359203 A | 12/2001 |
| JP | 2006262570 A | 9/2006 |
| WO | WO03075440 | 9/2003 |
| WO | WO2006057889 | 6/2006 |

OTHER PUBLICATIONS

U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,575, filed Jun. 16, 2008, Hafner et al.
USPTO office action for U.S. Appl. No. 12/139,575 dated Oct. 8, 2010.
USPTO office action for U.S. Appl. No. 12/194,210 dated Nov. 22, 2010.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.

USPTO notice of allowance for U.S. Appl. No. 12/139,575 dated Mar. 8, 2011.
USPTO office action for U.S. Appl. No. 12/139,569 dated Apr. 25, 2011.
USPTO office action for U.S. Appl. No. 12/139,571 dated Apr. 25, 2011.
USPTO office action for U.S. Appl. No. 12/139,565 dated Jun. 1, 2011.
USPTO Notice of Allowance dated Sep. 14, 2011, for U.S. Appl. No. 12/194,325.
USPTO Office Action dated Jun. 20, 2011, for U.S. Appl. No. 12/194,325.
Hafner et al., U.S. Appl. No. 13/430,864, filed Mar. 27, 2012, 55 pages.
Ambrosio et al., U.S. Appl. No. 13/431,539, filed Mar. 27, 2012, 66 pages.
Office Action, dated Mar. 1, 2012, regarding U.S. Appl. No. 12/139,562, 8 pages.
Notice of Allowance, dated Apr. 30, 2012, regarding U.S. Appl. No. 12/139,574, 17 pages.
Final Office Action, dated May 11, 2012, regarding U.S. Appl. No. 12/194,245, 32 pages.
USPTO Office Action dated Oct. 3, 2011, regarding U.S. Appl. No. 12/139,562, 65 pages.
USPTO Final Office Action dated Feb. 7, 2012, regarding U.S. Appl. No. 12/139,562, 47 pages.
USPTO Office Action dated Jan. 5, 2012, regarding U.S. Appl. No. 12/139,564, 26 pages.
USPTO Final Office Action dated Oct. 26, 2011, regarding U.S. Appl. No. 12/139,565, 27 pages.
USPTO Final Office Action dated Oct. 19, 2011, regarding U.S. Appl. No. 12/139,569, 35 pages.
USPTO Final Office Action dated Oct. 14, 2011, regarding U.S. Appl. No. 12/139,571, 36 pages.
USPTO Notice of Allowance dated Jan. 19, 2012, regarding U.S. Appl. No. 12/139,574, 38 pages.
Appeal Brief dated Aug. 24, 2011, regarding U.S. Appl. No. 12/194,210, 35 pages.
USPTO Examiner's Amswer dated Nov. 2, 2011, regarding U.S. Appl. No. 12/194,210, 21 pages.
Reply Brief dated Dec. 21, 2011, regarding U.S. Appl. No. 12/194,210, 15 pages.
USPTO Office Action dated Nov. 18, 2011, regarding U.S. Appl. No. 12/194,245, 40 pages.
USPTO Final Office Action dated Nov. 29, 2010, regarding U.S. Appl. No. 12/194,290, 10 pages.
Appeal Brief dated May 2, 2011, regarding U.S. Appl. No. 12/194,290, 57 pages.
USPTO Examiner's Answer dated Jul. 6, 2011, regarding U.S. Appl. No. 12/194,290, 24 pages.
Reply Brief dated Sep. 6, 2011, regarding U.S. Appl. No. 12/194,290, 9 pages.
USPTO Final Office Action dated dated Oct. 17, 2011, regarding U.S. Appl. No. 12/194,341, 15 pages.
Non-final office action dated May 26, 2010 regarding U.S. Appl. No. 12/048,183, 14 pages.
Notice of allowance dated Dec. 10, 2010 regarding U.S. Appl. No. 12/048,183, 10 pages.
Non-final office action dated Aug. 16, 2005 regarding U.S. Appl. No. 10/992,840, 9 pages.
Notice of allowance dated Dec. 1, 2005 regarding U.S. Appl. No. 10/992,840, 8 pages.
International search report dated Jan. 3, 2007 regarding application PCT/US2005/041688, 1 page.
Boujelelben et al., "Evaluation and optimization of a hybrid urban Microbus," IEEE Conference on Electric and Hybrid Vehicles, Dec. 2006, pp. 1-8.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Gonder et al., "Energy Management Strategies for Plug-In Hybrid Electric Vehicles," 2007 SAE World Congress, Apr. 2007, 13 pages.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV," 22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, pp. 83-93.
Short et al., "A Preliminary Assessment of Plug-In Hybrid Electric Vehicles on Wind Energy Markets," Technical Report NREL/TP-620-39729, National Renewable Energy Laboratory, Apr. 2006, 41 pages.
Zhonghao et al., "Research on Modeling and Simulation of Hybrid Electric Vehicle Energy Control Systems," Proceedings of the Eighth International Conference on Electrical Machines and Systems, vol. 1, Sep. 2005, 4 pages.
Non-final office action dated Aug. 17, 2012 regarding U.S. Appl. No. 13/431,539, 17 pages.
Final office action dated Jan. 16, 2013 regarding U.S. Appl. No. 13/431,539, 11 pages.
Notice of allowance dated Nov. 16, 2012 regarding U.S. Appl. No. 12/139,564, 10 pages.
Ackerman, "Hybrid Vehicle Cruises for Battle," Signal Magazine, Apr. 2004, 4 pages, accessed Jan. 9, 2013 http://www.afcea.org/content/?q=node/91.
"All About Plug-In Hybrids (PHEVs)," CalCars, California Car Initiative, Copyright 2012, 4 pages, accessed Jan. 9, 2013 http://www.calcars.org/vehicles.html.
Galdi et al., "Multi-Objective Optimization for Fuel Economy and Emissions of HEV Using The Goal-Attainment Method," EVA 18, published 2001, 12 pages.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.l3research.com/vehicles/enigma/specifications.htm.
"Plug-In Hybrids," hybridcars.com, copyright 2005, 2 pages, accessed Jan. 9, 2013 http://web.archive.org/web/20050310125208/http://www.hybridcars.com.
Powers, "Phev," About, Inc., copyright 2005, New York Times Company, 1 page, accessed Jan. 9, 2013 http://web.archive.org/web/20051231074047/http://hybridcars.about.com.
Suppes, "Plug-in Hybrid with Fuel Cell Battery Charger," International Journal of Hydrogen Energy, vol. 30, Issue 2, Feb. 2005, 9 pages.
Office Action, dated Mar. 18, 2013, regarding USPTO U.S. Appl. No. 12/139,564, 28 pages.
Notice of Allowance, dated May 6, 2013, regarding USPTO U.S. Appl. No. 12/139,564, 28 pages.

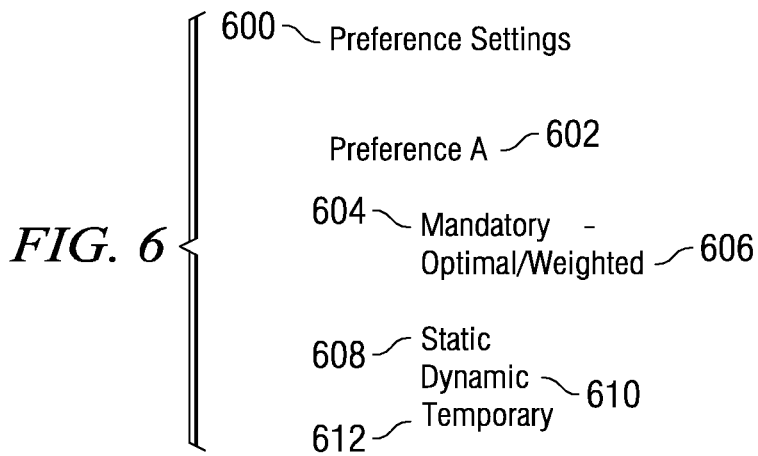
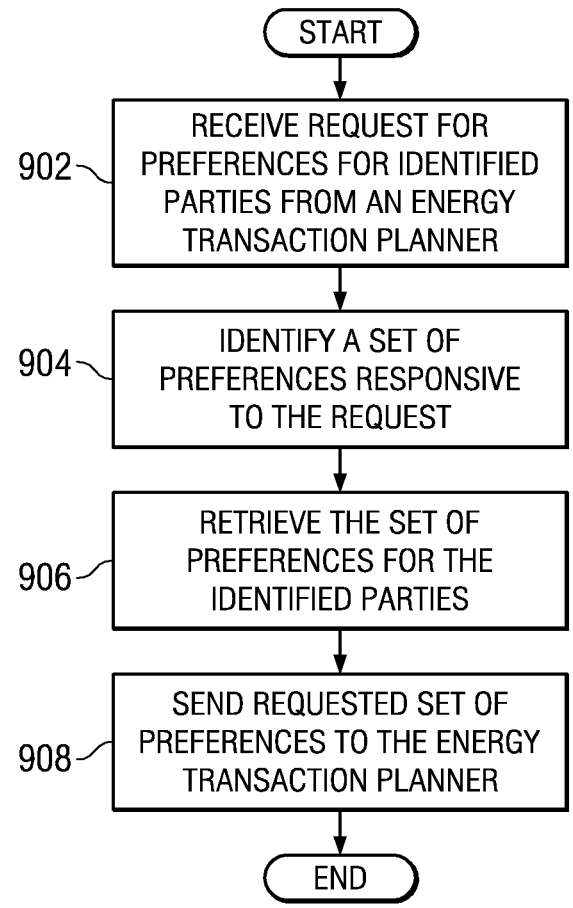

MAINTAINING ENERGY PRINCIPAL PREFERENCES IN A VEHICLE

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for a preference service on board an electric vehicle for managing user preferences associated with charging transactions for the electric vehicle.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, bio-diesel powered engines, solar powered generators and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment of the present invention, a computer implemented method, apparatus, and computer usable program code is provided for managing user preferences associated with electric vehicle charging transactions. In response to a vehicle preference service receiving a request for a set of preferences associated with a charging transaction for an electric vehicle from an energy transaction planner. The vehicle preference service identifies the set of principals associated with the charging transaction for the electric vehicle. A principal in the set of principals is an entity having an interest in the charging transaction for the electric vehicle. A charging transaction is a transaction associated with at least one of charging the electric vehicle, storing electric power in an electric storage mechanism associated with the electric vehicle, and de-charging the electric vehicle. The vehicle preference service is located on the electric vehicle. The vehicle preference service retrieves the set of preferences for each principal in the set of principals to form a set of preferences for the charging transaction. The set of preferences comprises a subset of preferences of interest for the each principal in the set of principals. A preference in the set of preferences specifies a parameter of the charging transaction that is to be minimized, maximized, or optimized. The vehicle preference service sends the set of preferences to the energy transaction planner.

BRIEF DESCRIPTION OF THE SEVERAL VIEWS OF THE DRAWINGS

FIG. 6 is a block diagram of preference settings in accordance with an illustrative embodiment;

FIG. 9 is a flowchart illustrating a process for a preference service providing preferences for a user to an energy transaction planner in accordance with an illustrative embodiment.

DETAILED DESCRIPTION OF THE INVENTION

Figure 1:
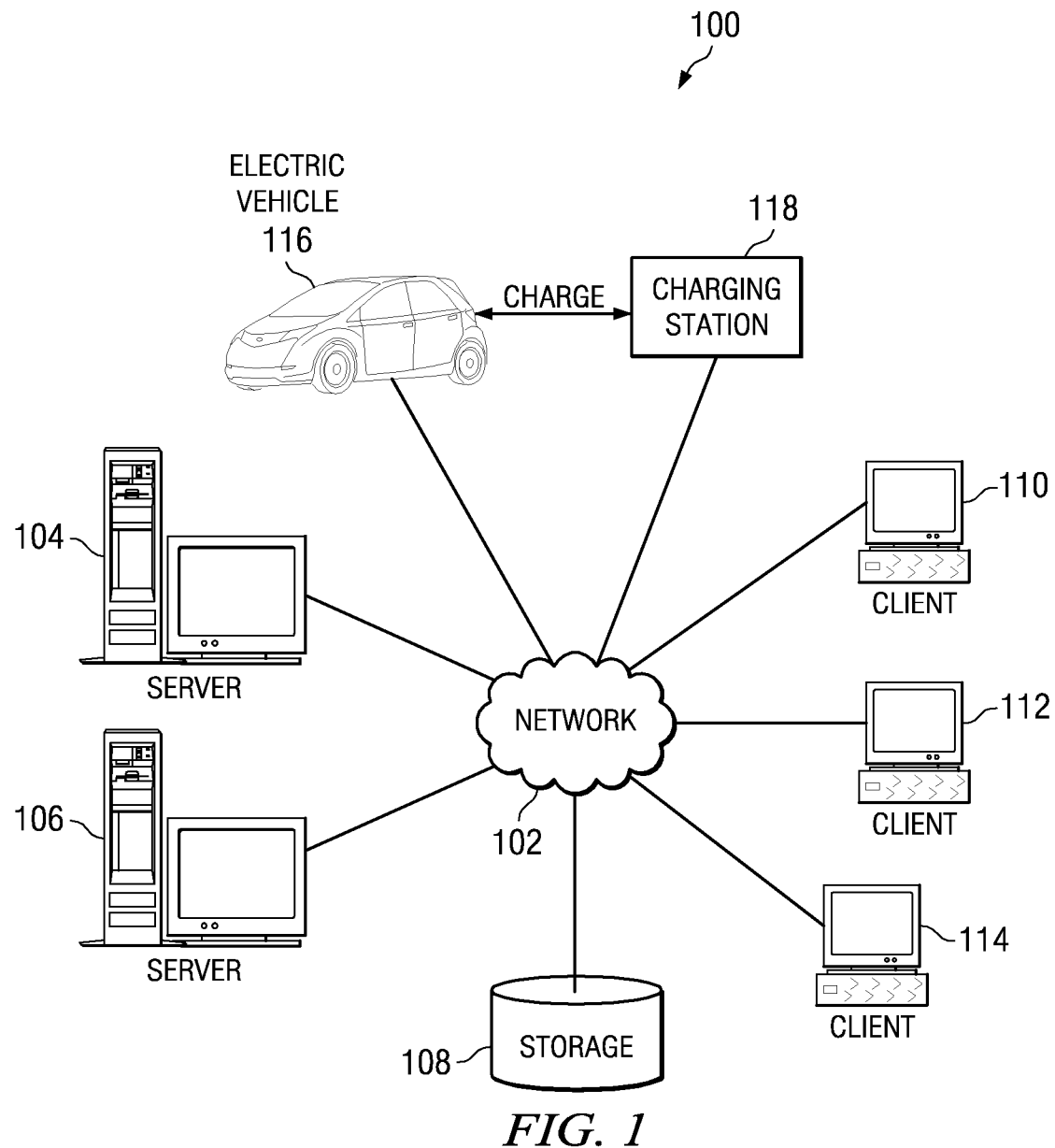
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
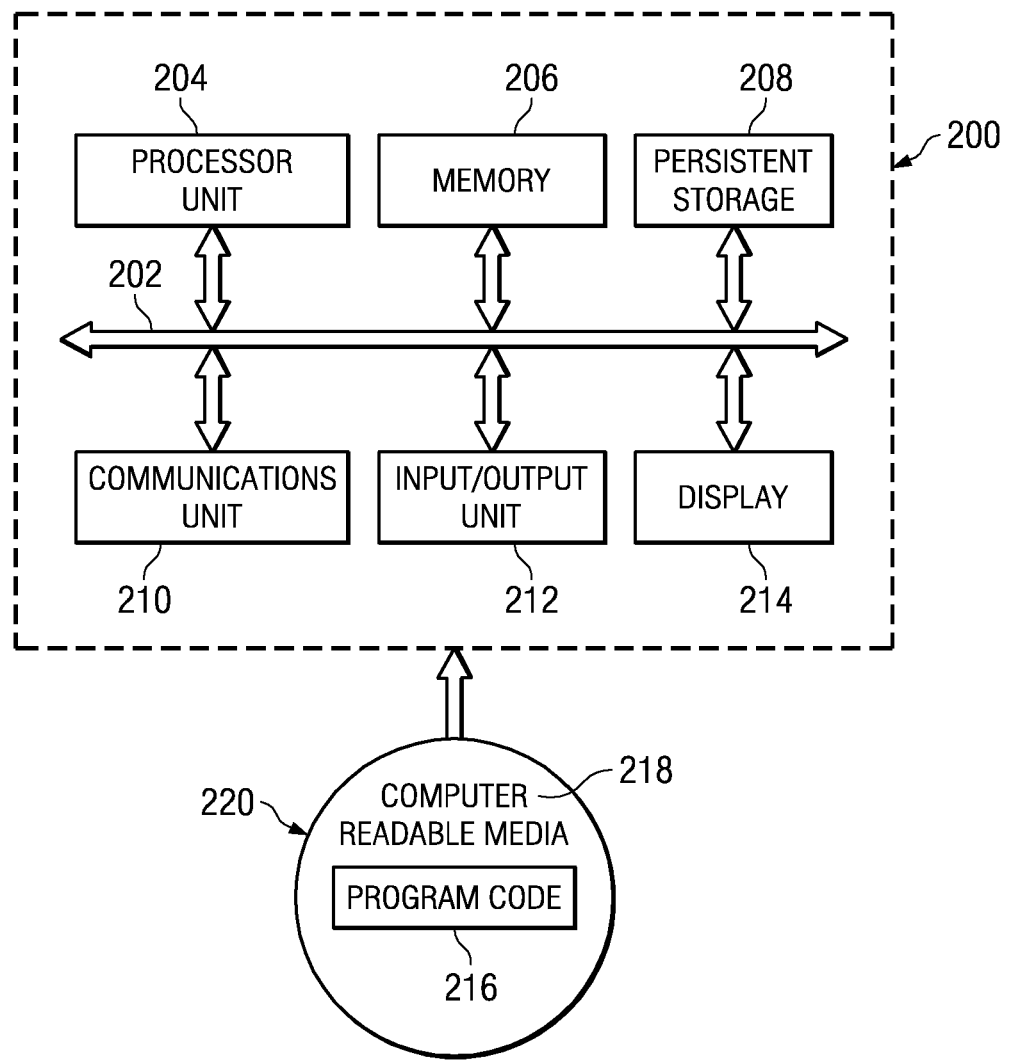
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle. Electric vehicle 116 is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism such as, but without limitation, solar power electric generators, gasoline powered electric generators, biodiesel powered electric generators, regenerative breaking systems, or any other type of on-vehicle electric power generation mechanism. Electric vehicle 116 may be any type of vehicle that relies in whole or in part on electric power to drive the vehicle, such as, for example and without limitation, a car, a truck, a motorcycle, a motor scooter, a three-wheeler, a sport utility vehicle, a van, an eighteen wheeler, an amphibious vehicle, or any other type of vehicle.

Charging station 118 is any station, kiosk, garage, power outlet, or other facility for providing electricity to electric vehicle 116. Electric vehicle 116 receives electricity from, or provides electricity to, an electric grid at charging station 118. In other words, electric charge may flow from an electric grid through charging station 118 to electric vehicle 116 or the electric charge may flow from electric vehicle 116 back into the electric grid through charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or nonvolatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase.

During the pre-charge phase of decision enablement, a charging plan is generated and all parties are presented with the conditions governing the charging transaction. During the charging phase, electricity flows to, from, or is stored in the electric vehicle. Finally, during the post-charge phase of the transaction, payment is made and an analysis is performed to provide incentives and induce specific behaviors on the part of one or more principals involved in the transaction. Additional charging infrastructure may also be provided to meter electricity at the point of charge, identify the various parties involved in the transaction, and provide flexible business rules governing the flow of funds between those parties.

Figure 3:
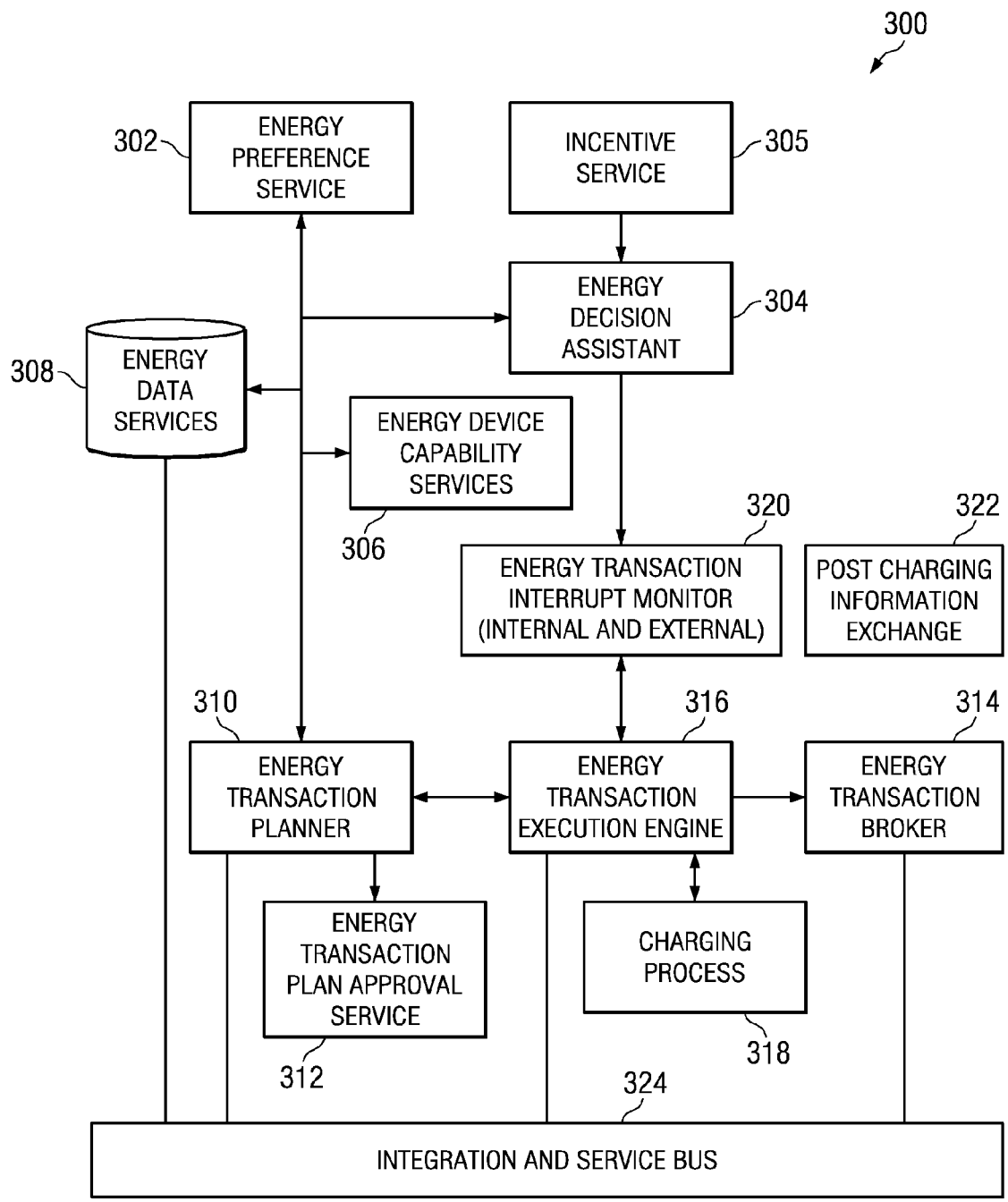
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions which are presented in standard formats which are universally understood and which can be readily communicated and agreed upon by all parties.

During the pre-charge phase, electric vehicle energy transaction infrastructure 300 utilizes energy preference service 302, energy decision assistant 304, incentive service 305, energy device capability services 306, energy data services 308, energy transaction planner 310, and optionally, energy transaction plan approval service 312 to generate a plan governing the charging transaction for the parties involved in the transaction.

Energy preference service 302 is a software component bolted on an electric vehicle that generates, stores, and retrieves preference information associated with the electric vehicle and the preference information associated with the parties to the transaction. Preferences may include, without limitation, a maximum price per kilowatt hour to be paid by a party for electricity, a location where charging may occur, a location where charging may not occur, a rate of charging the electric vehicle, a minimum amount of charge, or any other preferences associated with charging the electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 305 provides information describing current incentives to energy transaction planner 310. In one embodiment, incentives service 305 provides the information describing the incentives to energy decision assistant 304. Energy decision assistant 304 then provides the incentives information to energy transaction planner 310.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction. A utility refers to a provider of electric power. A utility typically provides electric power to a charging station via an electric power grid.

In this example, the charging phase begins when energy transaction execution engine 316 sends the transaction plan generated by energy transaction planner 310 for approval by energy transaction plan approval service 312, initiates the request to begin charging the electric vehicle, monitors and logs the health and safety of charging process 318, and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

During this charging phase, payment or fees for the charge are also recorded. Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

In one embodiment, a party that will be responsible for paying for electricity as an element of an electric vehicle charging transaction. An on-vehicle receiver maintains the data required to complete the electric vehicle charging transaction. The electric vehicle charging transaction comprises identifying at least one party paying the electric vehicle charge, the vehicle to be charged, and the relationship between the party and the electric vehicle. For example, the relationship between the party and the electric vehicle may be an owner of the electric vehicle, an operator of the electric vehicle, a renter of the electric vehicle, a utility associated with the electric vehicle, or any other relationship. Once the relationship is established, the charging of the storage mechanisms on the electric vehicle is performed.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, Wi-Fi networks, or any other type of wireless network.

According to one embodiment of the present invention, a computer implemented method, apparatus, and computer usable program code is provided for managing user preferences associated with electric vehicle charging transactions. In response to a vehicle preference service receiving a request for a set of preferences associated with a charging transaction for an electric vehicle from an energy transaction planner, the vehicle preference service identifies a set of principals associated with the charging transaction for the electric vehicle. A principal in the set of principals is any entity that may have an interest or role in the energy transaction, including but not limited to the vehicle operator, owner, charging kiosk, utilities associated with any or all of the other principals. The owner and operator of the vehicle may be the same person or the owner and operator of the vehicle may be different people. The vehicle preference service is coupled to the electric vehicle.

The charging transaction is a transaction associated with at least one of charging the electric vehicle, storing electric power in an electric storage mechanism associated with the electric vehicle, and de-charging the electric vehicle. As used herein the phrase "at least one of" when used with a list of items means that different combinations of one or more of the items may be used and only one of each item in the list is needed. For example, at least one of a charging the electric vehicle, storing electric power in an electric storage mechanism, and de-charging the electric vehicle may include, for example and without limitation, only charging the electric vehicle or a combination of charging the electric vehicle and storing electric power in an electric storage mechanism associated with the electric vehicle. This example also may include a transaction that involves any combination of charging the electric vehicle, storing electric power in an electric storage mechanism associated with the electric vehicle, and de-charging the electric vehicle. In addition, the charging, storing, and de-charging may occur more than one time during a given charging transaction. For example, during a single transaction, the electric vehicle may be de-charged, then charged, used to store electric power in the electric storage mechanism for a given time, then de-charged for a second time, and after a given time period, the electric vehicle may be re-charged again. All these occurrences of charging, storing, and de-charging may occur in a single charging transaction or in a series of two or more charging transactions.

A principal may select preferences for managing aspects of the electric vehicle's charging transactions using a user input/output device located on-board the electric vehicle. In other words, the principal uses an on-board system for maintaining, inputting, storing, and retrieving preferences that are used to manage the charging, de-charging, and/or storing of electric power associated with the electric vehicle.

The vehicle preference service retrieves the set of preferences from a plurality of preferences stored in a data storage device coupled to or located on the electric vehicle. The set of preferences comprises a subset of preferences of interest for each principal in the set of principals. A preference in the set of preferences specifies a parameter of the charging transaction that is to be minimized, maximized, or optimized. It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized state.

The vehicle preference service sends the set of preferences to an energy transaction planner. The energy transaction planner utilizes the set of preferences and the weighting value associated with the each preference to generate an energy transaction plan to control charging of the electric vehicle.

Figure 4:
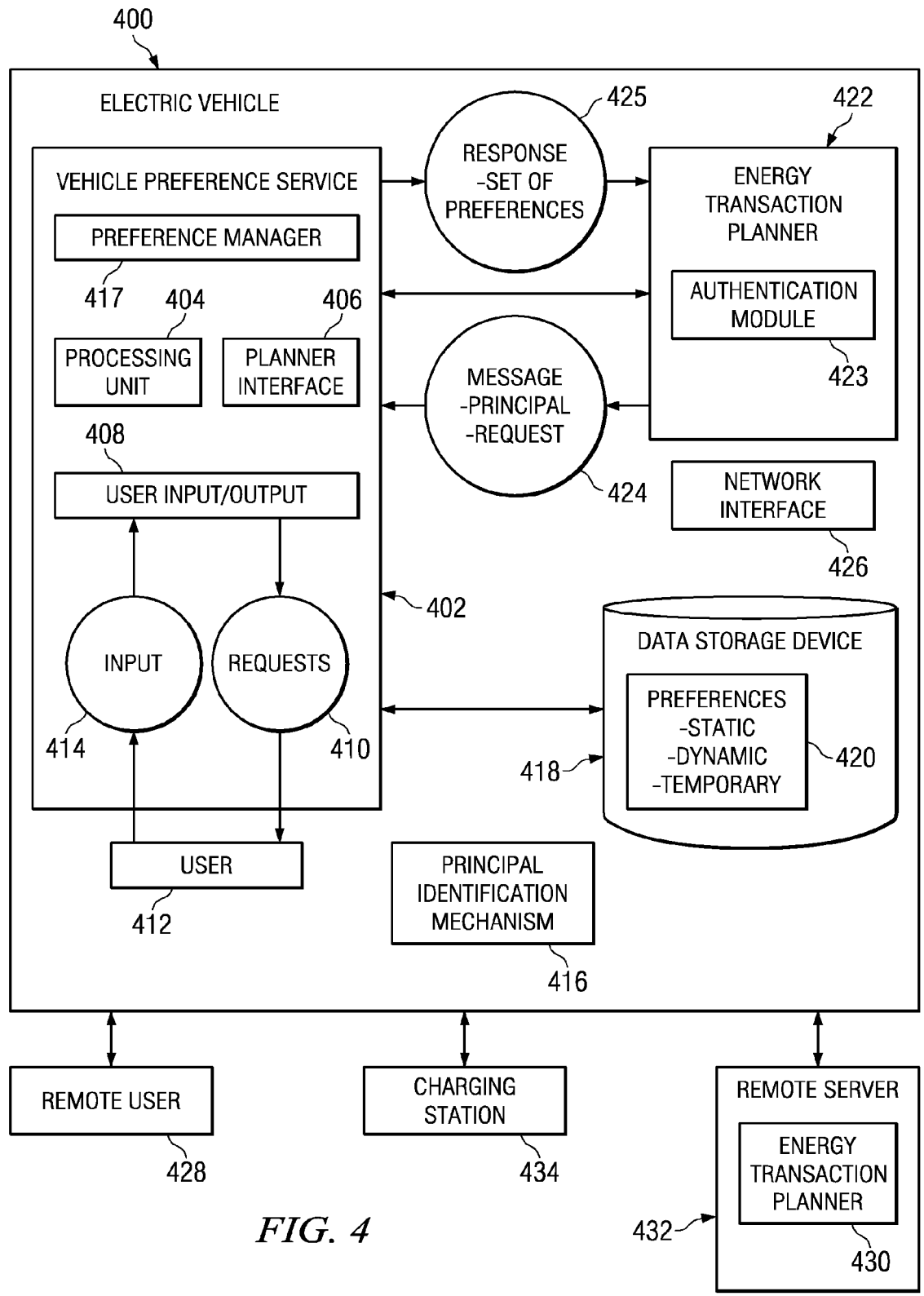
FIG. 4 is a block diagram of a vehicle preference service on-board an electric vehicle in accordance with an illustrative embodiment.

Turning now to FIG. 4, a block diagram of a vehicle preference service on-board an electric vehicle in accordance with an illustrative embodiment. Electric vehicle 400 is an electric vehicle that relies in whole or in part on electricity to drive the vehicle, such as, without limitation, electric vehicle 116 in FIG. 1.

Vehicle preference service 402 is a software component for creating, managing, storing, and retrieving preferences for electric vehicle 400 and one or more parties associated with a charging transaction for the electric vehicle, such as energy preference service 302 in FIG. 3. Vehicle preference service 402 is included within or bolted on electric vehicle 400. In other words, vehicle preference service 402 is a preference service that is included within the electric vehicle and manages preferences for the owner and/or operator of the electric vehicle. The owner and/or operator of the electric vehicle may be referred to as a principal involved in the energy transaction.

In one embodiment, vehicle preference service 402 is a system incorporated within the electric vehicle. In another embodiment, vehicle preference service 402 is added onto the electric vehicle as an after-market component. For example, and without limitation, vehicle preference service 402 may be added onto an electric vehicle as an add-on in a manner similar to the way in which global position system (GPS) navigation systems are added on to vehicles.

Vehicle preference service 402 comprises processing unit 404, planner interface 406, and user input/output 408. Processing unit 404 provides the overall coordination of the components associated with vehicle preference service 402. Vehicle preference service 402 responds to user input and requests or prompts users to enter input through user input/output 408. User input/output 408 may be implemented in any type of user interface for receiving user input and providing output to the user, such as, without limitation, a graphical user interface, a command line interface, a menu driven interface, a keyboard, a mouse, a touch screen, a voice-recognition system, or any other type of input/output device. User input/output 408 formats the user input into a form that can be processed by processing unit 404 and then stored by a data storage component on electric vehicle 400, such as data storage device 418.

User input/output 408 may also display previously selected preferences to user 412 and permit user 412 to enter an "acceptance" of the previously selected preferences or select an editing option to update or modify the previously selected preferences to form updated preferences for user 412. The preferences may be presented in a visual or graphical format on a display, in an audio format, presented as a combination of audio and visual content, presented in a raised format that can be read by the blind, or in any other format.

In another example, user input/output 408 may be used to obtain temporary preferences from user 412. Temporary preferences are only valid until a predetermined condition occurs. The predetermined condition may include, without limitation, expiration of an amount of time, a predetermined day of the week, day of the month, or time of day, expiration of a number of charging transactions, or any other condition.

Temporary preferences are used to override the default or previously selected preferences entered by user 412. The temporary preferences override the default preferences for a given period of time or for a given number of charging transactions. For example, temporary preferences may be selected to override the default preferences for user 412 for only the current charging transaction. User input/output 408 may prompt user 412 to provide temporary preferences for one or more upcoming transactions. The prompt may be provided by voice, screen display, or any other means for prompting user 412.

When vehicle preference service 402 requests an identity of user 412 from user 412. If the identity of user 412 indicates that user 412 is a new user, vehicle preference service 402 sends requests 410 to user 412 to prompt user 412 to select a set of preferences for user 412. Requests 410 are sent to user 412 through user input/output 408. User 412 enters preference choices as input 414 through user input/output 408. Vehicle preference service 402 stores the preference choices selected by user 412 in data storage device 418 as a set of preferences in preferences 420. In one embodiment, if user 412 is not a new user and pre-existing preferences are available for user 412, vehicle preference service 402 displays the pre-existing preferences to user 412 and gives user 412 an opportunity to update or change one or more of the preferences that user 412 previously selected.

When a user, such as user 412, creates a set of preferences and/or updates a pre-existing set of preferences for the user, vehicle preference service 402 uses principal identification mechanism 416 to identify the user that created and/or updated the set of preferences so that the correct set of preferences may later be retrieved when energy transaction planner 422 requests preferences for that particular user. In other words, principal identification mechanism 416 authenticates users of the preference service who request input/access to their preferences, for example, and without limitation, to initiate a planning phase. Principal identification mechanism 416 may include a badge reader, a radio frequency identification tag reader, a biometric device, a prompt requesting a password and/or user login, or any other type of identification mechanism. The biometric device may include, without limitation, a fingerprint scanner, a thumbprint scanner, a palm scanner, a voice print analysis tool, a retina scanner, an iris scanner, a device for reading deoxyribonucleic acid (DNA) patterns of the user, or any other type of biometric identification device.

Likewise, the identification of the user may include, without limitation, a user name, a password, a personal identification (PIN) number, an identifier, a fingerprint, a thumbprint, a retinal scan, an iris scan, or any other type of identification. The identification is associated with the set of preferences to map the set of preferences with the identification of the user that created the set of preferences. In another embodiment, security authentication, authorization, and/or identification information for the principal's identity may also be provided. The identification of user 412 may also be accomplished via the driver preference settings available on electric vehicle 400.

Preference manager 417 is a software component associated with vehicle preference service 402. Preference manager 417 creates, manages, stores, and retrieves preferences for one or more principals. Preferences 420 are choices for managing, governing, and/or controlling the manner in which electric vehicle 400 is charged with electric power at charging station 434, de-charged, or used for storage of electric power. De-charging refers to removing or drawing electric power from electric vehicle 400 and returning the electric power to a power grid associated with charging station 434. Charging station 434 is a station or kiosk for permitting electric vehicle 400 to connect to an electric grid to charge or de-charge electric vehicle, such as charging station 118 in FIG. 1.

A preference specifies a parameter of the charging transaction that is to be minimized, maximized, or optimized. A parameter of the charging transaction is any feature of the charging transaction, such as, without limitation, a rate of charging, a length of time for charging, a time to begin charging, a time to cease charging, a maximum level of charge, a minimum level of charge, or any other aspect of the charging transaction.

It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized.

Each preference may optionally be associated with a weighting value. For example, a preference may specify that charging at charging stations that obtain power from environmentally friendly, "green", wind farms is to be maximized while charging at charging stations that obtain power from "brown", coal powered plants that may be harmful to the environment and should be minimized. Brown energy refers to power generated from polluting sources, as opposed to green energy that is produced from renewable or less polluting energy sources.

Preferences 420 may also specify the price per kilowatt hour the user is willing to pay to charge the electric vehicle, identify certain charging stations the user prefers to fully charge electric vehicle 400 and identify other charging stations at which the user prefers to partially charge electric vehicle 400, perhaps due to proximity to the user's home or due to the source of the electricity used by charging station 434. For example, preferences may indicate that charging when the price per kilowatt hour is less than thirteen cents is to be maximized and charging when prices are higher than thirteen cents per kilowatt hour is to be minimized or prohibited all together. In another example, preferences 420 may specify a limit, such as, without limitation, buy electricity up to a certain price or optimize the cost of the return trip home given the current prices of gas and electricity.

Preferences 420 may be static, dynamic, or temporary preferences. A static preference is a preference that is effective until the user changes the preference. A static preference may be referred to as a default preference. A dynamic preference is a preference that does not have a predetermined value. A dynamic preference requires a user to enter a value for the dynamic preference in real time as the set of preferences responsive to the request of energy transaction planner 422. Thus, if a preference for the operator of the vehicle charging electric vehicle 400 is a dynamic preference, the principal is always prompted to enter a preference value indicating whether a particular operator of electric vehicle 400 is authorized to charge the electric vehicle. A user may choose to make a preference for operator charging electric vehicle 400 a dynamic preference so that the owner of electric vehicle 400 will always be informed of who is attempting to charge electric vehicle 400 and have the option of preventing the charging of electric vehicle 400 in real time prior to commencing of the charging transaction. A temporary preference is a preference that is only valid for a predetermined period of time. When the period of time expires, the temporary preference is invalid and no longer used. For example, a user may set a temporary preference that indicates no charging is to be performed for the next ten minutes at the charging station where the user is parked because the user is only going to be parked for five minutes. At the end of the ten minute time period, the temporary preference expires and electric vehicle 400 can begin charging if the electric vehicle 400 is still parked at the charging station.

Vehicle preference service 402 may store preferences 420 in any type of storage component, such as data storage device 418. Data storage device 418 may be implemented as any type of known or available device for storing data, such as, without limitation, a hard drive, a flash memory, a main memory, read only memory (ROM), a random access memory (RAM), a magnetic or optical disk drive, tape, or any other type of data storage device. Data storage may be implemented in a single data storage device or a plurality of data storage devices. Data storage device 418 is located locally on electric vehicle 400.

Preferences 420 are preferences selections chosen by one or more users. A set of preferences may be stored for each user in a plurality of principals. For example, if electric vehicle 400 is owned and operated by a single person, preferences 420 may only contain a set of preferences for the person that is the owner and operator. However, if electric vehicle 400 is owned by a company that frequently loans electric vehicles to employees, preferences 420 may include a set of preferences for the owner and a set of preferences for each employee that borrows electric vehicle 400. In such a case, vehicle preference service 402 may create, store, and manage hundreds of sets of preferences for hundreds of principals.

Vehicle preference service 402 receives requests from energy transaction planner 422 and responds to the requests from energy transaction planner 422 through planner interface 406. Planner interface 406 provides the necessary communication protocols and mechanisms to permit vehicle preference service 402 to communicate with energy transaction planner 422.

Energy transaction planner 422 is a component for generating an energy transaction plan to manage the charging of an electric vehicle connected to an electric grid in accordance with the preferences of one or more parties to the electric vehicle charging transaction, such as energy transaction planner 310 in FIG. 3. When energy transaction planner 422 is engaged to create a transaction plan to govern an electric vehicle charging transaction for electric vehicle 400, energy transaction planner 422 sends message 424 through planner interface 406 to vehicle preference service 402. Message 424 contains at least the identity one or more principals and a description of the specific preferences that are required by energy transaction planner 422. For example, energy transaction planner 422 may only need charging related preferences if the charging station is incapable of providing discharge or store services. Message 424 may be implemented as a single message including the identification of one or more principals and an identification of the types of preferences of interest for the energy transaction or two or more messages exchanged between energy transaction planner 422 and vehicle preference service 402.

Energy transaction planner 422 may include authentication module 423. Authentication module 423 comprises any type of known or available encryption technology and/or security protocols. Authentication module 423 authenticates and/or encrypts communications between vehicle preference service 402 and energy transaction planner 422. Authentication module 423 may be used to authenticate vehicle preference service 402 itself or authenticate tokens provided by vehicle preference service 402 for each of the principals for which vehicle preference service 402 is providing preferences to energy transaction planner 423. Authentication module 423 may also be used to authenticate information received from vehicle preference service 402 in response 425.

In response to receiving message 424, vehicle preference service 402 retrieves the one or more preferences from the plurality of preferences stored in preferences 420 in data storage device 418 for the principal identified in message 424. Preference manager 417 is a software component associated with vehicle preference service 402. Preference manager 417 identifies specific preferences in preferences 420 that are responsive to the request in message 424. Preference manager 417 retrieves the preferences that are responsive to the request for the identified user to form a set of preferences. The set of preferences are sent to energy transaction planner 422 via response 425 for utilization in generating an energy transaction plan. In other words, response 425 comprises the set of preferences that are responsive to the request in message 424.

The principal may need to store and make available electric vehicle charging preferences for utilization by energy transaction planner 422. The principal uses on-board vehicle preference service 402 to maintain, input, store, and/or retrieve preferences 420 for the principal and/or one or more other parties associated with the electric vehicle charging transaction, such as, without limitation, a electric utility of the owner, an electric utility of the operator, the charging station, the electric vehicle manufacturer, the electric vehicle distributor, or any other party with an interest in the electric vehicle charging transaction.

In this embodiment, user 412 is an operator of electric vehicle 400 located inside or in close proximity to electric vehicle 400. However, in another embodiment, one or more principals may be located remotely to electric vehicle, such as remote user 428. Remote user 428 may be an owner of electric vehicle that has loaned electric vehicle 400 to a family member, friend, or employee. Remote user 428 may specify that a set of preferences for remote user 428 are to be used instead of the preferences of the operator or in addition to the preferences of the operator of electric vehicle. In such a case, the set of preferences for remote user 428 that are responsive to the request in message 424 in addition to the set of preferences for user 412 that is responsive to the request are sent to energy transaction planner 422. Energy transaction planner 422 then generates an energy transaction plan using the preferences for both user 412 and remote user 428.

In the example shown in FIG. 4, energy transaction planner 422 is an on-vehicle component that is attached, coupled to, or located on electric vehicle 400. However, in another embodiment, vehicle preference service 402 may receive message 424 from an energy transaction planner that is located on a computing device that is remote from electric vehicle 400, such as energy transaction planner 430 on remote server 432. Energy transaction planner 422 sends message 424 with an identification of one or more principals and a request for preferences of interest to vehicle preference service 402 over a network via network interface 426.

Network interface 426 is any type of network access software known or available for allowing electric vehicle 400 to access a network. Network interface 426 connects to a network connection, such as network 102 in FIG. 1. The network connection permits access to any type of network, such as a local area network (LAN), a wide area network (WAN), or the Internet. Vehicle preference service 402 utilizes network interface 426 to send the set of preferences to off-vehicle energy transaction planner 430 that is located on a remote computing device.

In this example, preferences 420 include preferences for an owner and/or operator of electric vehicle 400. In another embodiment, preferences 420 may also include preferences for principals other than the owner and/or operator of electric vehicle 400. For example, a principal may also include an owner or operator of charging station 434, a utility, a financial institution, or any other party having an interest in the electric vehicle charging transaction. The non-owner or operator principals may have their preferences entered into the on-vehicle preference service by the owner or operator of electric vehicle 400 on their behalf.

Figure 5:
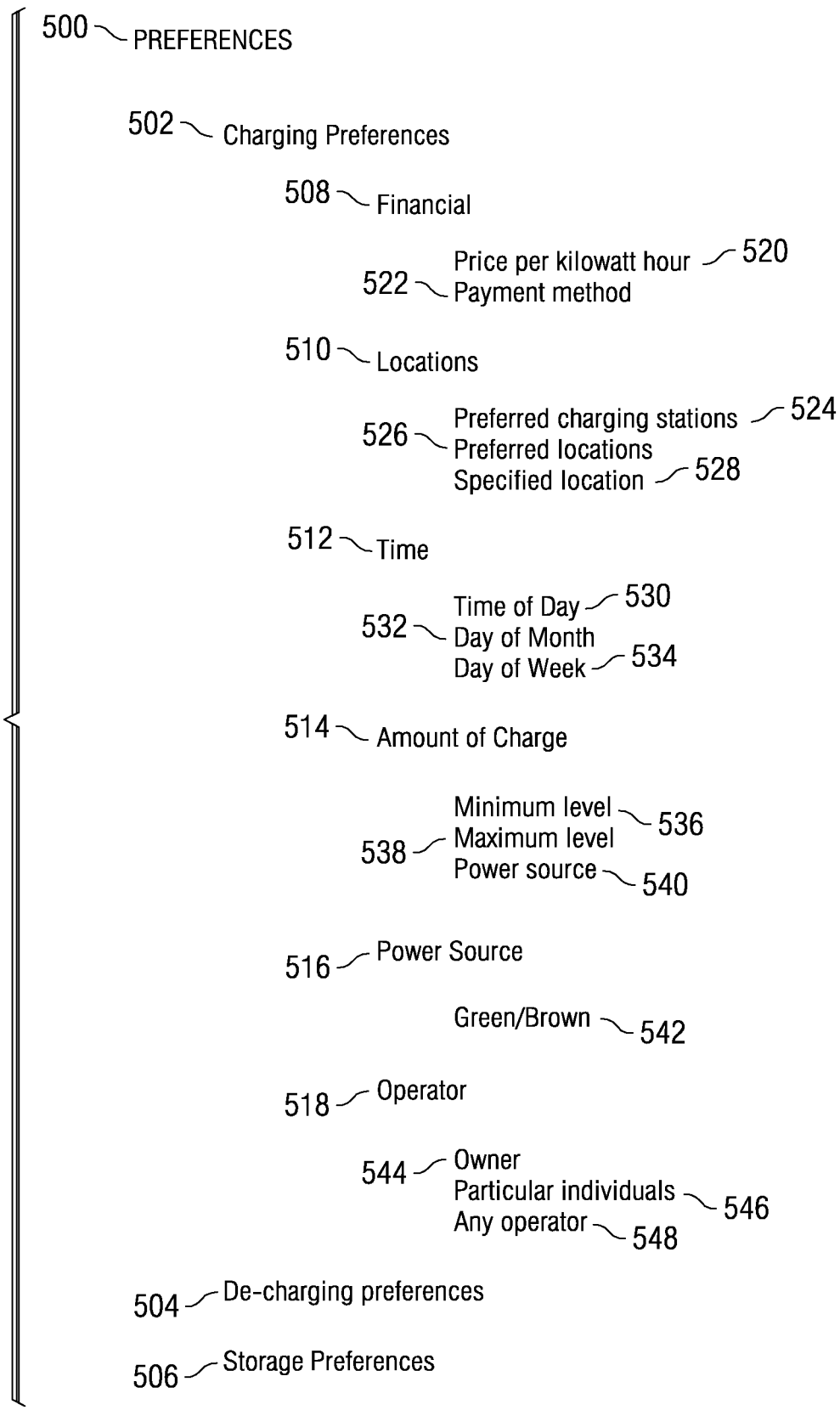
FIG. 5 is a block diagram of vehicle preferences in accordance with an illustrative embodiment.

Referring to FIG. 5, a block diagram of vehicle preferences is shown in accordance with an illustrative embodiment. Preferences 500 are types of preferences that may be included within preferences for one or more users, such as preferences 420 in FIG. 4. Preferences 500 may be charging preferences 502 for governing energy transaction to charge an energy storage device associated with the electric vehicle, de-charging preferences 504 for governing energy transactions for de-charging or depleting the energy stored in an energy storage device, or storage preferences 506 for governing the storage of electricity in the electric vehicle's energy storage mechanisms.

A user may wish to de-charge or transfer power from the electric vehicle to a charging station if the price of the electricity is higher than when the electricity was purchased and stored in the electric vehicle. For example, if a user charges an electric vehicle at night when the price of the electricity is only nine cents per kilowatt hour, the user may wish to de-charge or provide electricity from the electric vehicle back to the charging station at noon when the price per kilowatt hour is fifteen cents because the user is able to make a profit from storing the electricity in the electric vehicle until the price of electricity increases and then selling the electricity back to the electric grid.

Some examples of charging preferences include, without limitation, financial 508, locations 510, time 512, amount of charge 514, power source 516, and/or operator 518. For example, financial 508 preferences may specify price per kilowatt hour 520 that the user is willing to pay to charge the electric vehicle or payment method 522 for purchasing the electricity from the charging station and/or the electricity grid. Payment method 522 may include, without limitation, credit cards, cash, debit card, credit, or any other type of payment. The payment type preferences may even specify a particular credit card or bank account for debit to pay for the charging transaction.

Locations 510 preferences may specify preferred charging station 524, preferred locations 526 of the charging stations, and/or specified locations 528 for charging. For example, the user may specify that any time the electric vehicle is parked at a charging station that is at a specified location, the electric vehicle is not to be charged at all, to be charged to a particular charge level, or to be fully charged. The user may wish to set these preferences because the charging stations are a given distance from the user's home or workplace, due to past service received at the charging station, or any other factors.

Time 512 preferences may specify, without limitation, time of day 530 for charging the vehicle, time of day to stop charging the vehicle, day of month 532 for charging, and/or day of the week 534 for charging the electric vehicle.

Amount of charge 514 preferences may specify minimum level 536 of charge in the electric vehicle's storage device, a maximum level of charge 538, or specify different levels of charge depending on power source 540 of the electricity used to charge the electric vehicle. If the power source is a "green" source, such as solar power, the user may specify a higher charge level than if the power source is a more environmentally harmful, or "brown" power source, such as coal or oil.

Power source 516 preferences specify types of power sources that are acceptable or preferred and/or provide weighting values for different power sources. The power sources may be identified as "green" or "brown" 542. The power sources may also be identified specifically by the type of power source, such as wind, solar, coal, oil, and so forth.

Operator 518 preferences are preferences for allowing particular operators to charge the electric vehicle. Owner 544 is a preference that permits an owner to charge, particular individuals 546 permits identified individuals to charge the vehicle, and any operator 548 is a preference that permits anyone to charge the electric vehicle. The operator 518 preference may permit a user to prevent or impede theft of the electric vehicle. For example, if a user sets owner 544 as a mandatory preference that only permits the owner to charge the electric vehicle, a thief would not be permitted to recharge the electric vehicle. Therefore, a thief may not be able to transport the electric vehicle very far from the location at which the electric vehicle was stolen.

The preferences described for charging preferences 502 are only example of some preferences that may be used. A vehicle preference service is not required to utilize all of the preferences shown in FIG. 5. Moreover, a vehicle preference service may utilize other preferences not shown in FIG. 5 without departing from the scope of the embodiments.

Finally, the preferences shown for charging preferences 502 may also be used as preferences for de-charging preferences 504 and/or storage preferences 506, in addition to other preferences not shown. For example, de-charging preferences 504 may include operator 518 preferences specifying operators that are permitted to de-charge or sell power back to the electric grid, financial 508 specifying prices at which the electricity may be transferred from the electric vehicle and sold back to the electric grid, time 512 when de-charging may occur, amount of charge 514 levels for de-charging, and power source 516 of the power that is de-charged.

FIG. 6 is a block diagram of preference settings in accordance with an illustrative embodiment. Preference settings 600 are settings that may be appended to a preference, such as preference A 602. Preference A 602 may be any type of preference, such as, without limitation, financial, locations, time, amount of charge, power source, operator, or any other preferences. Mandatory 604 specifies that the requirements of a particular preference must be met or a charging transaction will not be permitted. For example, if a user sets an operator preference indicating that only the owner is permitted to charge the electric vehicle and the user sets the preference to mandatory, only the owner will be permitted to initiate charging of the electric vehicle. Any other operator of the electric vehicle will not be permitted to charge the electric vehicle unless the owner changes the preference settings.

Optional/weighted 606 is a setting that indicates that a preference is preferred or desirable, but not mandatory. For example, the user may specify that "green" power sources, such as wind and solar power sources, are preferred but not mandatory. In such cases, the energy transaction planner may still permit charging of the electric vehicle at charging stations that utilize electricity provided by coal powered electric generators. The weighting value permits a user to indicate how strongly the user wants a particular preference to be minimized, maximized, or optimized. In the example above, the user may indicate a high weighting value in favor of wind and solar power, a medium weighting value for nuclear power plants, and a low weighting value for coal power plants. The energy transaction planner may then use the weighting value to determine how much to charge or de-charge the electric vehicle or whether to charge or de-charge the electric vehicle at all.

Static 608 indicates that a preference is a default preference that should be used in all cases. A static preference does not change from one charging transaction to the next charging transaction. Dynamic 610 setting indicates that a user wants to provide or select a value or choice for this preference every time a charging transaction plan is generated. A dynamic preference is selected in real time as the charging transaction is commencing. Temporary 612 indicates that a temporary preference value is to be used in place of a static preference for a limited period of time. For example, a user may wish to override a static preference that the electric vehicle should always be fully charged at a particular charging station with a temporary preference indicating that the electric vehicle is not to be charged because the user will only be parked at the charging station for a few minutes.

Figure 7:
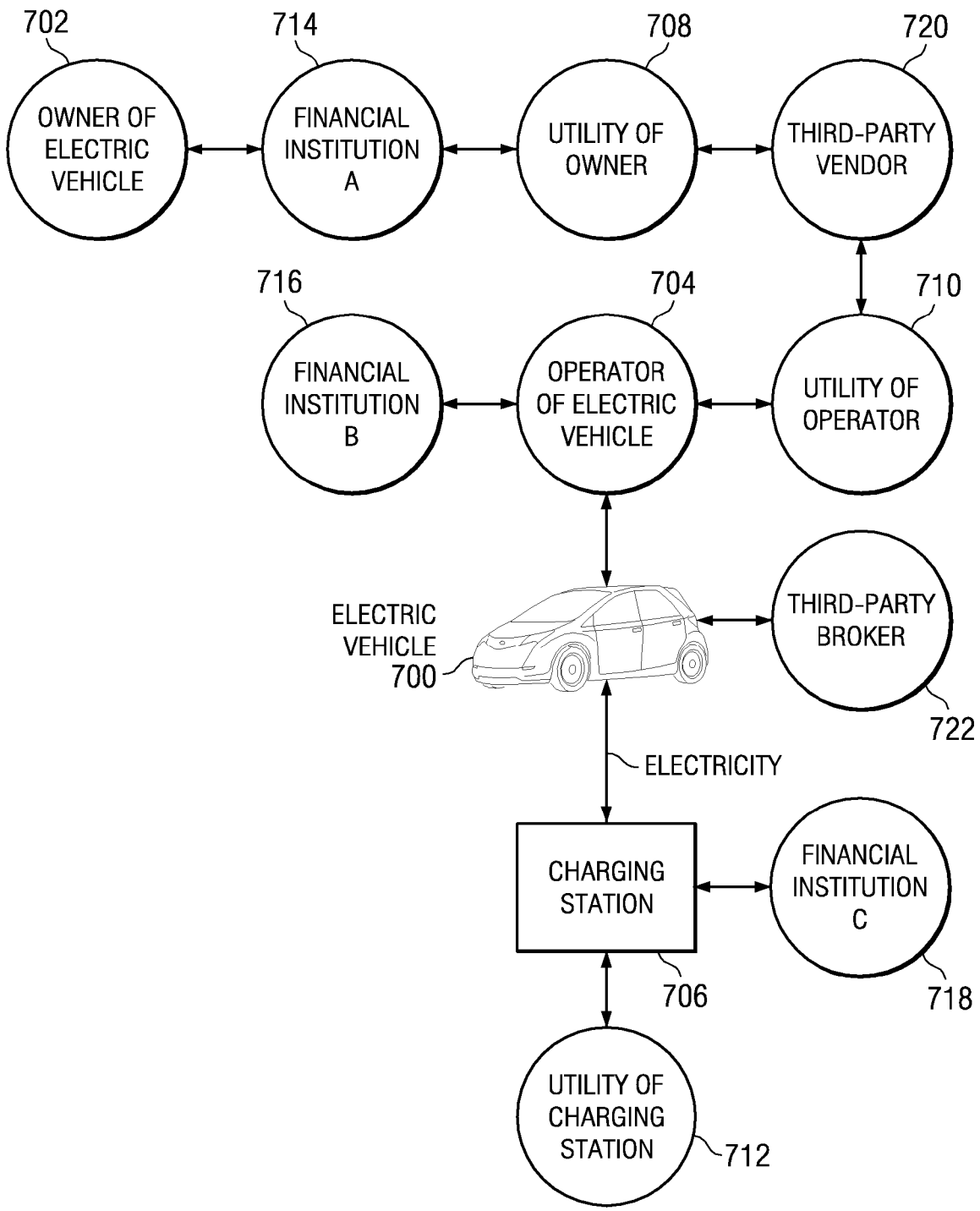
FIG. 7 is a block diagram of parties to an electric vehicle charging transaction in accordance with an illustrative embodiment.

Turning now to FIG. 7, a block diagram of parties to an electric vehicle charging transaction is depicted in accordance with an illustrative embodiment. Each party may have a set of preferences for charging the electric vehicle that is managed by the vehicle preference service. A principal is any entity that may have an interest or role in the energy transaction for charging an electric vehicle, including but not limited to, the vehicle operator, owner of the electric vehicle, the owner of the charging station, the operator of the charging station, financial institutions associated with one or more of the parties, utilities associated with one or more of the principals, or third parties having an interest in the charging transaction. FIG. 7 illustrates the different relationships between principals. Any one or more of the principals shown in FIG. 7 may have preferences stored in the on-vehicle preference service.

Electric vehicle 700 is a vehicle that relies in whole or in part on electric power to drive the vehicle, such as electric vehicle 118 in FIG. 1 or electric vehicle 400 in FIG. 4. Owner of electric vehicle 702 is a principal that creates a set of preferences in vehicle preference service on electric vehicle 700. Operator of electric vehicle 704 is a principal that may be the owner or only someone that has borrowed electric vehicle 700. Each operator may optionally create their own set of preferences in the vehicle preference service on electric vehicle. Charging station 706 is a station or kiosk at which electric vehicle obtains charge or de-charges to provide electricity back to the electric grid, such as charging station 118 in FIG. 1 or charging station 434 in FIG. 4. Charging station 706 may also have a set of preferences for governing the charging of electric vehicle 700.

Each party may have a utility associated with the party. Each utility may also have preferences for governing the charging transaction. For example, utility of owner 708, utility of operator 710, and utility of charging station 712 may each be parties with an interest in the charging transaction and preferences for governing the charging of electric vehicle 700.

Each party may also have a financial institution for paying for the electricity purchased, or for being reimbursed for electricity provided back to the electric grid. A financial institution may be a bank, a credit card company, a broker, a lender, or any other financial institution. For example, financial institution A 714 may be associated with owner of electric vehicle 702, financial institution B 716 may be associated with operator of electric vehicle 704, and financial institution C 718 may be associated with charging station 706. Each of these financial institutions may have preferences for controlling how amounts due are received, how charges of payments are received and accepted, how credits are issued and received, and other aspects of financial transactions associated with charging electric vehicle 700.

Third party vendor 720 is a third party that is not associated with charging station 706 or electric vehicle 700. For example, and without limitation, third party vendor 720 may be a grocery store, a convenience store, a car wash, a repair shop, or any other type of vendor. Third party broker 722 is a third party that may provide financing or manage financial transactions associated with charging electric vehicle 700.

Each of the parties shown in FIG. 7 may optionally have preferences, constraints, limitations, or requirements associated with charging electric vehicle 700. The vehicle preference service on electric vehicle 700 may optionally store, manage, and retrieve some or all of these preferences, constraints, limitations, and requirements in data storage device on electric vehicle 700. The vehicle preference service retrieves the information of interest that is responsive to a request by an energy transaction planner and sends the preferences of interest to the energy transaction planner for use in generating a plan to govern the charging of electric vehicle 700 at charging station 706.

Figure 8:
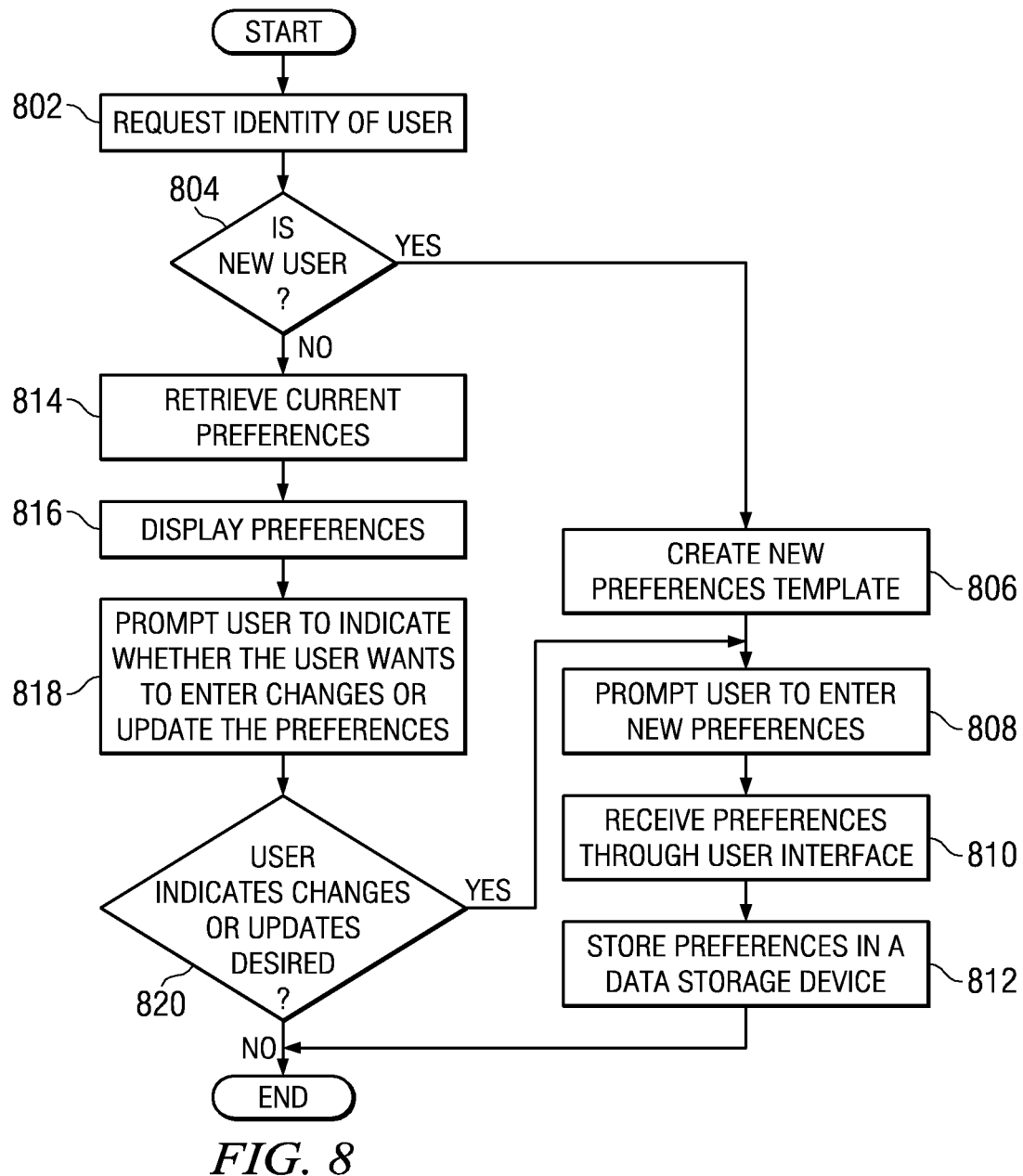
FIG. 8 is a flowchart illustrating a process for creating and storing preferences by a vehicle preference service in accordance with an illustrative embodiment.

FIG. 8 is a flowchart illustrating a process for creating and storing preferences by a vehicle preference service in accordance with an illustrative embodiment. The process in FIG. 8 is implemented by an energy preference service on an electric vehicle, such as vehicle preference service 402 in FIG. 4.

The process begins by requesting an identity of a user (step 802). The user may be identified using any type of identification means, such as, without limitation, a user name, a password, a personal identification (PIN) number, an identifier, a fingerprint, a thumbprint, a retinal scan, an iris scan, or any other type of identification. The user may be an owner of an electric vehicle, an operator of the electric vehicle, a utility, a financial institution, an owner or operator of a charging station, a third party broker, or any other principal shown in FIG. 7. The vehicle preference service makes a determination as to whether the user is a new user (step 804). If the user is a new user, the vehicle preference service creates a new preferences template (step 806). The vehicle preference service prompts the user to enter new preferences (step 806). The user may enter the preference selections through a user interface, such as user input/output 408 in FIG. 4. The vehicle preference service receives the preferences through the user interface (step 810). The vehicle preference service stores the preferences in the data storage device (step 812) with the process terminating thereafter.

Returning to step 804, if the user is not a new user, the vehicle preference service retrieves current preferences for the user (step 814). The vehicle preference service displays the preferences to the user (step 816). The display may be provided as visual content, audio content, a combination of audio and visual content, or any other type of presentation of the preferences.

The vehicle preference service prompts the user to indicate whether the user wants to enter changes or update the preferences (step 818). If the user indicates that changes or updates are desired, the vehicle preference service prompts the user to enter new preferences (step 808). The vehicle preference service receives the preferences through the user interface (step 810). The preferences are updated or modified preferences. The vehicle preference service stores the preferences in the data storage device (step 812) to form updated preferences for the user with the process terminating thereafter.

The process shown in FIG. 8 permits a user to input their preferences directly into an on-vehicle preference service. This process also permits a user to store preferences for one or more other principals. For example, if the user is the owner of the electric vehicle, the user may wish to enter the user's own preferences and the preferences for the user's utility company and one or more frequent operators of the electric vehicle.

Referring now to FIG. 9, a flowchart illustrating a process for a preference service providing preferences for a user to an energy transaction planner is shown in accordance with an illustrative embodiment. The process in FIG. 9 is implemented by an energy preference service on an electric vehicle, such as vehicle preference service 402 in FIG. 4.

The process begins by receiving a request for preferences for identified parties from an energy transaction planner, such as energy transaction planner 422 in FIG. 4 (step 902). The identified parties include one or more principals, such as the principals shown in FIG. 7. The energy transaction planner may send one or more requests for preferences for one or more identified parties to a single energy preference service or to two or more energy preference services. In this example, the energy transaction planner sends the request for preferences to an on-vehicle preference service, such as vehicle preference service 402 in FIG. 4.

The preference service identifies a set of preferences responsive to the request (step 904). The set of preferences includes a subset of preferences for each party in the identified parties. The preference service retrieves the set of preferences for the identified parties (step 906). The preference service sends the requested preferences to the energy transaction planner (step 908) with the process terminating thereafter.

Figure 10:
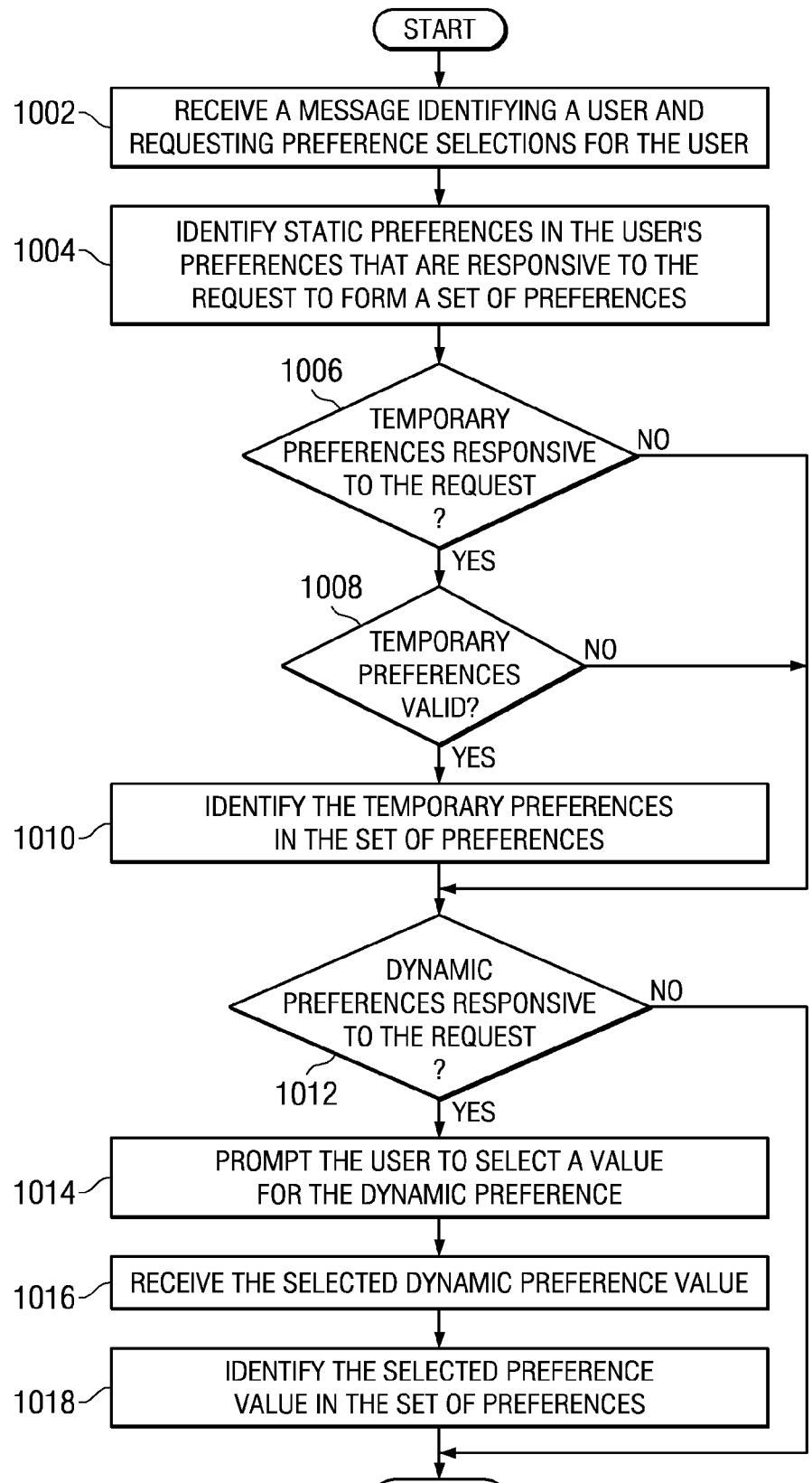
FIG. 10 is a flowchart illustrating a process for identifying a set of preferences for an identified principal by a preference service in accordance with an illustrative embodiment.

FIG. 10 is a flowchart illustrating a process for identifying a set of preferences for an identified principal by a preference service in accordance with an illustrative embodiment. The process in FIG. 10 is implemented by an energy preference service on an electric vehicle, such as vehicle preference service 402 in FIG. 4. The process in FIG. 10 is a more detailed description of steps 902-904 in FIG. 9.

The process begins by receiving a message identifying a user and requesting preference selections for the user (step 1002). The preference service identifies static preferences in the user's preferences that are responsive to the request, such as static preference 608 in FIG. 6, to form a set of preferences (step 1004). A preference that is responsive to a request is a preference that is a type of preference of interest to the transaction. For example, an energy transaction planner may be concerned with identifying how long to charge an electric vehicle. In such a case, the types of preferences of interest that are responsive to the request may include amount of charge 514 and time 512 in FIG. 5 while preferences associated with de-charging and storage preferences may not be responsive to the request.

The preference service makes a determination as to whether any temporary preferences, such as temporary preferences 612 in FIG. 6, are responsive to the request (step 1006). If any temporary preferences are responsive to the request, the preference service makes a determination as to whether the temporary preferences are valid (step 1008). A temporary preference is valid until a predetermined condition occurs, such as, without limitation, a predetermined period of time or an occurrence of a predetermined number of charging transactions. The temporary preference may be invalid if the time period during which the temporary preference is valid is expired or the number of charging transactions have already occurred. If the temporary preference is valid at step 1008, the preference service identifies the temporary preferences in the set of preferences (step 1010). In other words, the valid temporary preferences that are responsive to the request are included in the set of preferences along with the static preferences.

The preference service determines whether any dynamic preferences are responsive to the request (step 1012). If none of the dynamic preferences are responsive to the request, the process terminates thereafter. If one or more of the dynamic preferences for the user is responsive to the request, the preference service prompts the user to select a value for the dynamic preference (step 1014). A value for a dynamic preference is a selected setting or choice for the dynamic preference. The preference service receives the selected value for the dynamic preference from the user (step 1016). The preference service identifies the selected dynamic preference value in the set of preferences (step 1018). In other words, the selected dynamic preference is included in the set of preferences for the user, in addition to the static preferences and any temporary preferences responsive to the request, with the process terminating thereafter.

According to one embodiment of the present invention, a computer implemented method, apparatus, and computer usable program code is provided for managing user preferences associated with electric vehicle charging transactions. In response to a vehicle preference service receiving a request for preferences associated with a charging transaction for an electric vehicle from an energy transaction planner, the vehicle preference service identifies a set of principals associated with the charging transaction for the electric vehicle. The vehicle preference service is located on the electric vehicle.

The vehicle preference service identifies preferences in a plurality of preferences that are responsive to the request to form preferences of interest. The vehicle preference service retrieves the preferences of interest for each principal in the set of principals to form a set of preferences for the charging transaction. The set of preferences comprises a subset of preferences of interest for the each principal in the set of principals. A preference specifies a parameter of the charging transaction that is to be minimized, maximized, or optimized. The vehicle preference service sends the set of preferences to an energy transaction planner. The energy transaction planner utilizes the set of preferences and the weighting value associated with the each preference to generate an energy transaction plan to control charging of the electric vehicle.

In this manner, one embodiment provides a system for charging an electric vehicle's electricity storage mechanism while managing all aspects of the electric vehicle charging transaction. The system demonstrates the capability for identifying the party that will be responsible for paying for the electricity as part of an electric vehicle charging transaction. As part of this process, a user paying for the electric vehicle charge is identified, the electric vehicle is identified, and the relationship between the user and the electric vehicle is identified. Once the relationship of the parties is established, the charging of the electric vehicle storage mechanisms can commence.

The on-vehicle preference service enables management of information that is used to improve financial transactions associated with charging electric vehicles. The illustrative embodiments specify how and what information is passed between discrete entities to charge an electric vehicle at arbitrary charging locations. The on-board vehicle preference service creates, manages, stores, and retrieves preferences for an electric vehicle and one or more principals associated with the electric vehicle charging transaction. The principals may include, without limitation, an electric vehicle owner, the electric vehicle operator, one or more electric power utilities, one or more financial institutions, one or more owners and/or operators of a charging station, a third party broker, or any other principal. In this manner, the preference service provides extensive information regarding the electric vehicle charging preferences for multiple parties to an energy transaction planner during pre-charge transactions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing user preferences associated with charging transactions for electric vehicles, the computer implemented method comprising:
    receiving a request for a set of preferences associated with a charging transaction for an electric vehicle from an energy transaction planner, wherein the request is received by a vehicle preference service included within the electric vehicle;
    responsive to a vehicle preference service receiving a request for a set of preferences associated with a charging transaction for an electric vehicle from an energy transaction planner, identifying a set of principals associated with the charging transaction for the electric vehicle, wherein a principal in the set of principals is an entity having an interest in the charging transaction for the electric vehicle, and wherein the charging transaction is a transaction associated with at least one of charging the electric vehicle, storing electric power in an electric storage mechanism associated with the electric vehicle, and de-charging the electric vehicle;
    responsive to identifying the set of principals associated with the charging transaction for the electric vehicle, retrieving the set of preferences from a plurality of preferences, by the vehicle preference service, wherein the set of preferences comprises a subset of preferences of the plurality of preferences for each principal in the set of principals, wherein a preference in the set of preferences specifies a parameter of the charging transaction that is to be minimized, maximized, or optimized, wherein the plurality of preferences comprises a maximum price per kilowatt hour to be paid by a party for electricity, a location where charging may occur, a location where charging may not occur, a rate of charging the electric vehicle, a minimum amount of charge, wherein each preference in the plurality of preferences is associated with a weighting value and wherein retrieving the set of preferences further comprises retrieving the weighting value associated with each preference in the set of preferences; and sending the weighting value associated with the each preference in the set of preferences to the energy transaction planner, wherein the weighting value indicates a priority of each preference relative to other preferences in the set of preferences; and
    sending the set of preferences to the energy transaction planner, by the vehicle transaction planner.

2. The computer implemented method of claim 1 further comprising:
    receiving a selection of preferences from a principal in the set of principals to form selected preferences for the principal in the plurality of preferences, wherein the principal enters the selection of preferences using a user interface coupled to the electric vehicle, wherein the selection of preferences comprises prices at which electricity may be transferred from the electric vehicle and sold back to an electric grid; and responsive to receiving an identification of the principal, associating the identification of the principal with the selected preferences for the principal.

3. The computer implemented method of claim 2 wherein the identification is selected from a group consisting of a principal name, a password, a personal identification number, a fingerprint, a thumbprint, a retinal scan result, and an iris scan result.

4. The computer implemented method of claim 1 further comprising:

responsive to a determination that a principal is a new principal, creating a preferences template and prompting the new principal to select preferences;

receiving selected preferences from the new principal through a user interface; and storing the selected preferences for the new principal in the plurality of preferences.

5. The computer implemented method of claim 1 further comprising:

responsive to a determination that a principal has previously selected preferences to form current selected preferences, retrieving the current selected preferences for the principal and presenting the current selected preferences to the principal;

responsive to receiving a selection to enter changes to the current selected preferences by the principal, prompting the principal to enter the changes to the current selected preferences;

receiving the changes to the current selected preferences; and storing the changes to the current selected preferences in a data storage device to form updated preferences for the principal.

6. The computer implemented method of claim 1 wherein retrieving the set of preferences from the plurality of preferences further comprises:

responsive to identifying a temporary preference in the subset of preferences for a given principal, determining whether the temporary preference is valid, wherein a temporary preference is a preference that is only valid until a predetermined condition occurs; and responsive to a determination that the temporary preference is valid, including the temporary preference in the subset of preferences for the given principal.

7. The computer implemented method of claim 1 wherein retrieving the set of preferences from the plurality of preferences further comprises:

responsive to identifying a dynamic preference in the subset of preferences for a given principal, prompting the given principal to select a preference value for the dynamic preference, wherein the dynamic preference is a preference that requires a selection of a preference value by the given principal in real time as the subset of preferences is being generated;

receiving a selection of the preference value for the dynamic preference from the given principal; and including the dynamic preference and the value selected for the dynamic preference in the subset of preferences.

8. The computer implemented method of claim 1 wherein each preference in the set of preferences is associated with an indicator that indicates whether the preference is mandatory or optional, wherein all requirements of a mandatory preference are met during the charging transaction, and wherein the charging transaction is stopped in response to a determination that a mandatory preference is not met.

9. The computer implemented method of claim 1 wherein the principal is selected from a group consisting of an operator of the electric vehicle, an owner of the electric vehicle, an owner of a charging station, an operator of the charging station, an electric power provider of the owner of the electric vehicle, an electric power provider of the operator of the electric vehicle, an electric power provider of the owner of the charging station, a financial institution, and a third party broker.

10. A computer program product comprising:

a computer usable storage medium including computer usable program code for managing user preferences associated with charging transactions for electric vehicles, the computer program product comprising:

computer usable program code for receiving a request for a set of preferences associated with a charging transaction for an electric vehicle from an energy transaction planner, wherein the request is received by a vehicle preference service included within the electric vehicle;

computer usable program code for identifying a set of principals associated with a charging transaction for an electric vehicle in response to a vehicle preference service receiving a request for preferences associated with the charging transaction for the electric vehicle from an energy transaction planner, wherein a principal in the set of principals is an entity having an interest in the charging transaction for the electric vehicle, and wherein the charging transaction is a transaction associated with at least one of charging the electric vehicle, storing electric power in an electric storage mechanism associated with the electric vehicle, and de-charging the electric vehicle;

computer usable program code, responsive to identifying the set of principals associated with the charging transaction for the electric vehicle, for retrieving the set of preferences from a plurality of preferences, by the vehicle preference service, wherein the set of preferences comprises a subset of preferences of the plurality of preferences for each principal in the set of principals, wherein a preference in the set of preferences specifies a parameter of the charging transaction that is to be minimized, maximized, or optimized, wherein the plurality of preferences comprises a maximum price per kilowatt hour to be paid by a party for electricity, a location where charging may occur, a location where charging may not occur, a rate of charging the electric vehicle, a minimum amount of charge, wherein each preference in the set of preferences is associated with a weighting value and further comprising computer usable program code for retrieving the weighting value associated with the each preference in the set of preferences and computer usable program code for sending the weighting value associated with the each preference in the set of preferences to the energy transaction planner, wherein the weighting value indicates a priority of each preference relative to other preferences in the set of preferences; and computer usable program code for sending the set of preferences to the energy transaction planner, by the vehicle transaction planner.

11. The computer program product of claim 10 further comprising:

computer usable program code for creating a preferences template and prompting a principal to enter selected preferences in response to a determination that the principal is a new principal;

computer usable program code for receiving the preferences selected by the new principal through a user interface; and computer usable program code for storing the preferences selected by the new principal to form selected preferences for the new principal in the plurality of preferences.

12. The computer program product of claim 10 further comprising:
  computer usable program code for retrieving current selected preferences for a principal and presenting the current selected preferences to the principal in response to a determination that the principal has previously selected preferences to form the current selected preferences;
  computer usable program code for prompting the principal to enter changes to the current preferences in response to receiving a selection to enter the changes to the current selected preferences by the principal;
  computer usable program code for receiving the changes to the current selected preferences; and
  computer usable program code for storing the changes to the current selected preferences in a data storage device to form updated preferences for the principal.

13. The computer program product of claim 10 further comprising:
  computer usable program code for prompting a principal to select a preference value for a dynamic preference in response to identifying the dynamic preference in a subset of preferences for the principal in the set of preferences, wherein the dynamic preference is a preference that requires a selection of a preference value by the principal in real time as the set of preferences is being generated;
  computer usable program code for receiving a selection of the preference value for the dynamic preference; and
  computer usable program code for including the dynamic preference and the value selected for the dynamic preference in the set of preferences.

14. An apparatus comprising:
  a bus system;
  a communications system coupled to the bus system;
  a memory connected to the bus system, wherein the memory includes computer usable program code; and
  a processing unit coupled to the bus system, wherein the processing unit executes the computer usable program code to receive a request for a set of preferences associated with a charging transaction for an electric vehicle from an energy transaction planner, wherein the request is received by a vehicle preference service included within the electric vehicle; identify a principal associated with a charging transaction for an electric vehicle in response to a vehicle preference service receiving a request for a set of preferences associated with the charging transaction for the electric vehicle from an energy transaction planner, wherein the principal is an entity having an interest in the charging transaction for the electric vehicle, and wherein the charging transaction is a transaction associated with at least one of charging the electric vehicle, storing electric power in an electric storage mechanism associated with the electric vehicle, and de-charging the electric vehicle; responsive to identifying the set of principals associated with the charging transaction for the electric vehicle, retrieve the set of preferences from a plurality of preferences, by the vehicle preference service, wherein the set of preferences comprises a subset of preferences of the plurality of preferences for each principal in the set of principals, wherein a preference in the set of preferences specifies a parameter of the charging transaction that is to be minimized, maximized, or optimized, wherein the plurality of preferences comprises a maximum price per kilowatt hour to be paid by a party for electricity, a location where charging may occur, a location where charging may not occur, a rate of charging the electric vehicle, a minimum amount of charge, wherein each preference in the set of preferences is associated with a weighting value, and wherein the processor unit further executes the computer usable program code to retrieve the weighting value associated with each preference in the set of preferences; and send the weighting value associated with the each preference in the set of preferences to the energy transaction planner, wherein the weighting value indicates a priority of each preference relative to other preferences in the set of preferences; and send the set of preferences to the energy transaction planner, by the vehicle transaction planner.

15. The apparatus of claim 14 wherein the processor unit further executes the computer usable program code to retrieve current selected preferences for a principal and present the current selected preferences to the principal in response to a determination that the principal has previously selected preferences to form the current selected preferences; prompt the principal to enter changes to the current selected preferences in response to receiving a selection to enter the changes to the current selected preferences by the principal; receive the changes to the current selected preferences; and store the changes to the current selected preferences in a data storage device to form updated preferences for the principal.

16. A vehicle preference service on an electric vehicle comprising:
  a planner interface, wherein the planner interface receives a request for a set of preferences for an identified principal associated with a charging transaction for the electric vehicle from an energy transaction planner, and wherein the planner interface sends the set of preferences responsive to the request to the energy transaction planner, wherein the identified principal is an entity having an interest in the charging transaction for the electric vehicle, wherein the charging transaction is a transaction associated with at least one of charging the electric vehicle, storing electric power in an electric storage mechanism associated with the electric vehicle, and de-charging the electric vehicle; and
  a preference manager, wherein the preference manager retrieves the set of preferences from a plurality of preferences stored on the electric vehicle for the identified principal, wherein a preference in the set of preferences specifies a parameter of the charging transaction that is to be minimized, maximized, or optimized, wherein the plurality of preferences comprises a maximum price per kilowatt hour to be paid by a party for electricity, a location where charging may occur, a location where charging may not occur, a rate of charging the electric vehicle, a minimum amount of charge, wherein each preference in the set of preferences is associated with a weighting value, and wherein the processor unit further executes the computer usable program code to retrieve the weighting value associated with each preference in the set of preferences; and send the weighting value associated with the each preference in the set of preferences to the energy transaction planner, wherein the weighting value indicates a priority of each preference relative to other preferences in the set of preferences.

17. The vehicle preference service of claim 16 further comprising:

a user input/output interface, wherein the user input/output interface receives an identification of a principal and associates the identification of the principal with the set of preferences created by the principal in response to the principal creating the set of preferences.

\* \* \* \* \*